Patented Jan. 4, 1938

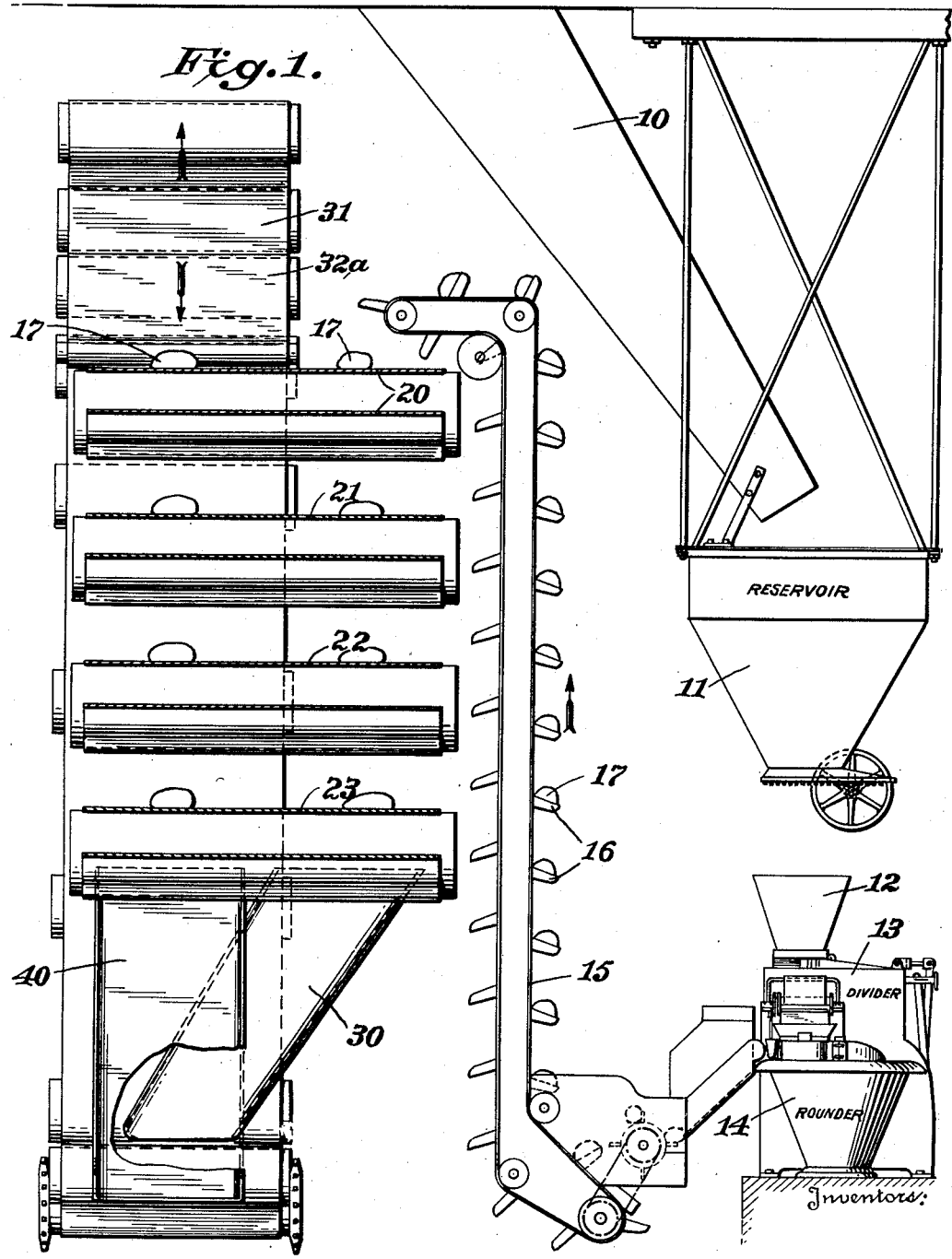

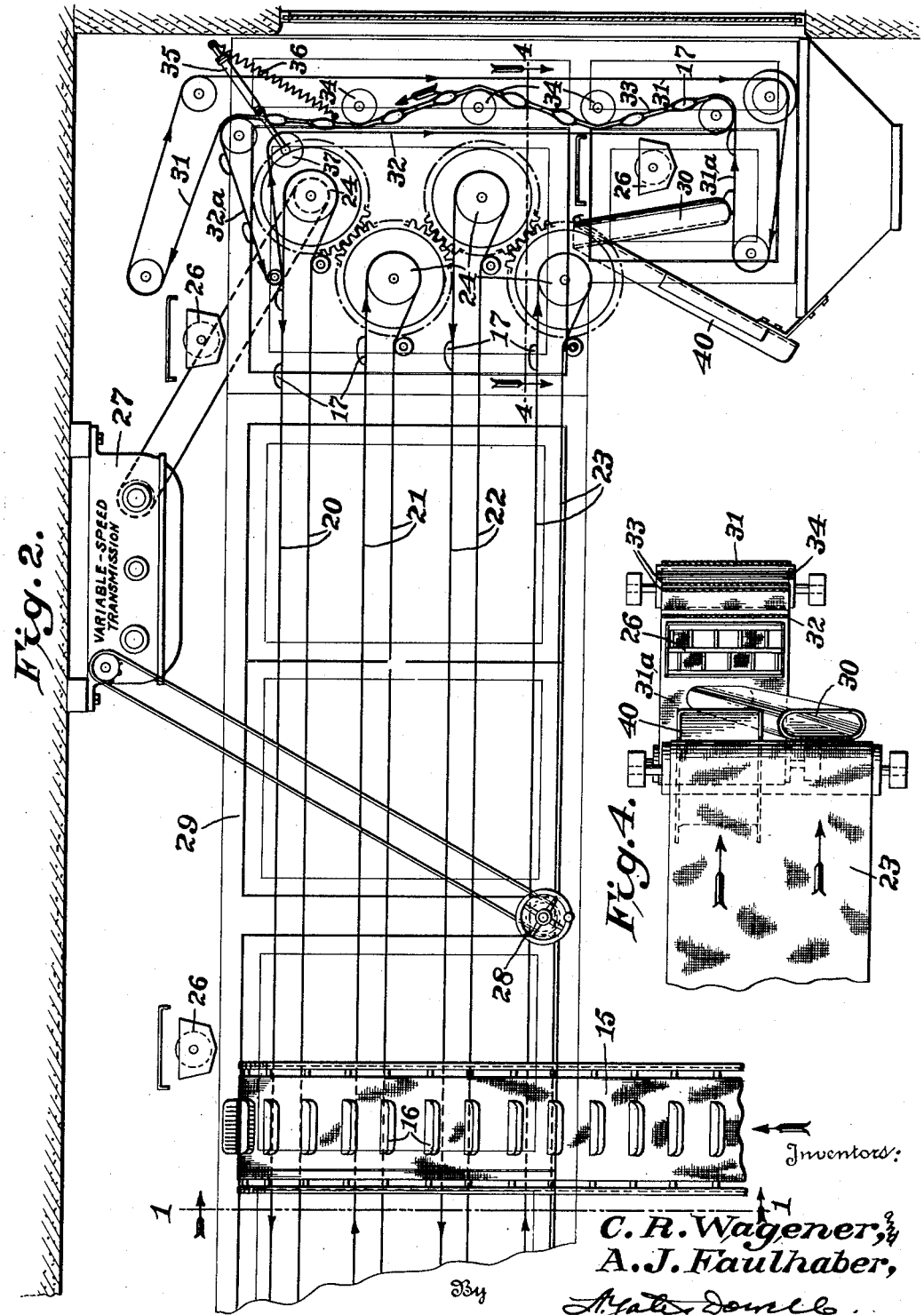

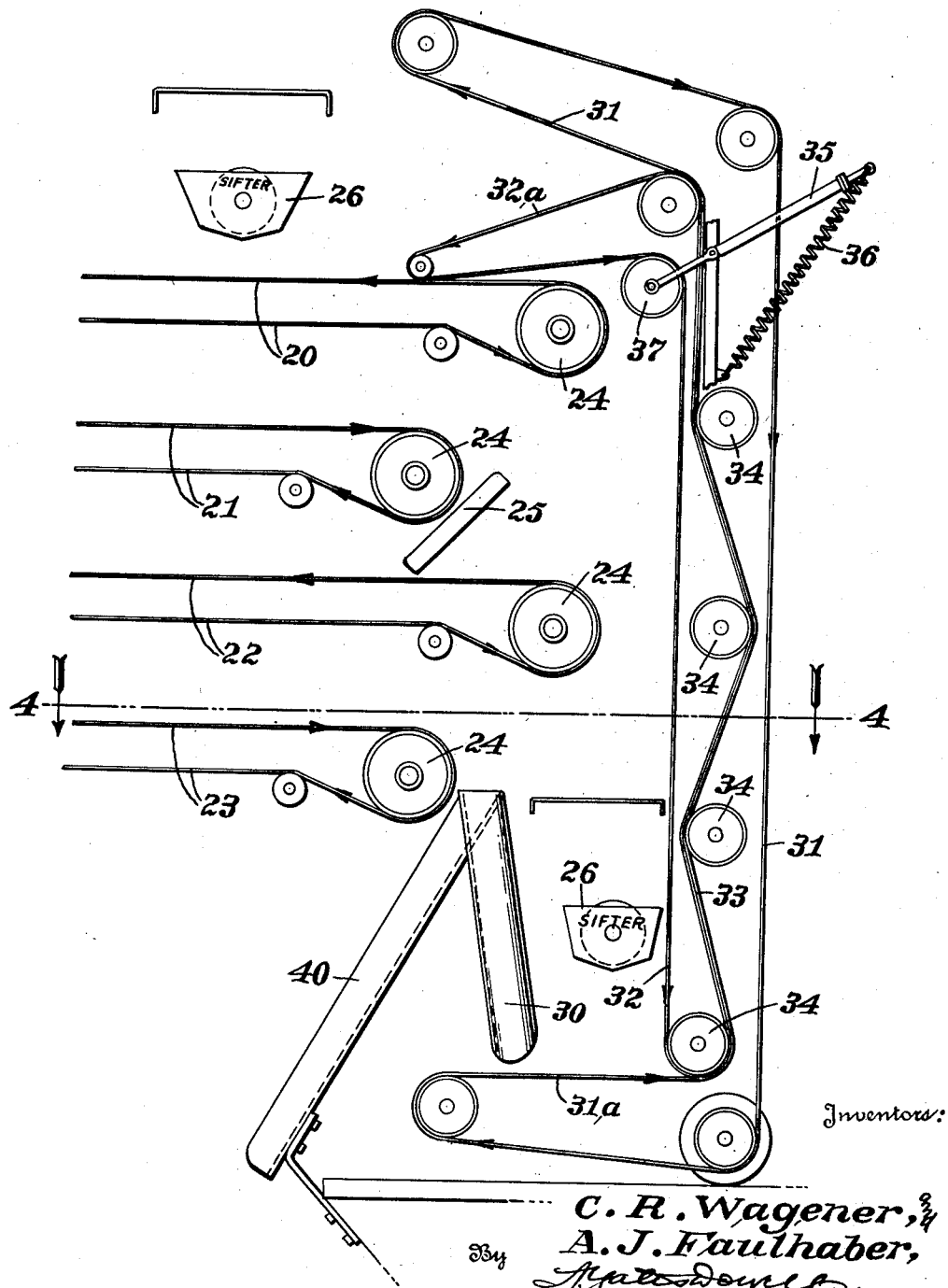

2,104,282

UNITED STATES PATENT OFFICE 2,104,282

APPARATUS FOR TREATING DOUGH

Carnot R. Wagener and Albert J. Faulhaber, Cincinnati, Ohio

Application October 15, 1934, Serial No. 748,395

3 Claims. (Cl. 107—7)

This invention relates to a method and apparatus for treating dough, and more particularly to a method and apparatus for treating dough made from wheat flour in order to improve the quality and palatability of bread and the like made therefrom.

Hitherto it has been common practice in all large commercial bakeries to rest the dough for an interval of several minutes after cutting and rounding the same into pieces or masses of desired size, after which the dough is placed by hand in the baking pans. This resting step in the process is called "proofing" and is for the purpose of conditioning the dough to obviate the effects of the compression or pinching of the dough during the cutting and rounding operations, as well understood by those skilled in the art.

Proofing is commonly carried out in a proofer to which the masses of dough are conveyed in succession and in which they remain for a predetermined time. It has been considered undesirable to work or compress the dough during the proofing operation on the theory that such working would prolong the rest period required and permit fermentation of the dough to proceed to an undesirable extent. The dough must be carefully treated at this stage as apparently slight variations in the time or conditions of the proofing operation effect radical changes in the final loaf and may render the same heavy or coarse-grained and in consequence unpalatable and unsaleable.

It is an object of the present invention to so modify the proofing step hitherto employed as to improve the structure of the finished product, imparting a closer grain and finer texture to the loaf.

Another object of the invention is to improve the finished product by compressing or otherwise degassing the mass of dough during the proofing operation.

A further object of the invention is to improve the construction of the proofer and to provide for double-proofing the mass of dough to impart improved qualities to the finished product.

A still further object of the invention is to provide an attachment or accessory equipment of a simple character for the ordinary proofer whereby it is adapted to carry out the improved method as described above.

Other objects and advantages of the invention will be apparent from the following description of the preferred embodiment thereof shown on the accompanying drawings, wherein:

Fig. 1 is a sectional view of the proofer taken on the line 1—1 of Fig. 2, with certain associated elements of the system or apparatus shown in elevation;

Fig. 2, a view of the proofer in side elevation;

Fig. 3, a detail view to an enlarged scale of one end of the proofer as shown in Fig. 2 and Fig. 4, a sectional detail view taken on the line 4—4 of Fig. 2, showing one end of the lower belt and the discharge chutes associated therewith.

In accordance with the invention apparatus, of which the preferred form is illustrated on the accompanying drawings, is provided for treating bread dough in order to improve the grain and texture of the loaf by modifying the treatment of the dough during the proofing operation. The improved method may be carried out on the usual or conventional proofer by a simple modification thereof as described hereinafter.

The invention is particularly applicable to the treatment of dough made from wheat flour which is to be utilized for making bread and therefore this particular use of the invention will be referred to, although the invention is not limited thereto. In the apparatus illustrated in the drawings, a dough chute 10 is shown which is adapted to receive dough which has been properly mixed and fermented, for example on a floor immediately above the floor on which the proofer is located.

The dough is discharged from the chute 10 into a reservoir 11 and is allowed to pass from this reservoir into the hopper 12 of a divider 13 in such quantities as to keep the hopper 12 supplied at all times. The divider 13 cuts and scales the dough into individual pieces or masses of desired size which are transferred to a rounder 14 where the masses of dough are formed into round pieces. As well understood by those skilled in the art it is necessary at this point to rest the dough before further handling and before the same is molded and placed in the oven to be baked. For this purpose a proofer is employed, that shown on the accompanying drawings representing a conventional form of such proofer except for certain features and improvements hereinafter referred to.

The rounded masses or units of dough may be conveyed to the proofer in any suitable manner, as by means of a belt conveyor 15 having buckets 16 thereon, said buckets being of such size as to accommodate the units of dough as indicated at 17. The upper portion of the conveyor 15 overlies the uppermost belt 20 of the proofer and is adapted to discharge the dough units onto said belt.

As shown in Fig. 2, the proofer comprises essentially the usual horizontal belts 20, 21, 22 and 23, superimposed one above the other. The belts are supported and driven by rollers 24 and the ends of alternate belts overlap so that the masses of dough deposited on the uppermost belt are transferred successively to each of the lower belts. A chute 25 may be disposed between the ends of the belts to facilitate and guide the movement of the dough units from one belt to the belt underneath. Sifter or dusting devices 26 are arranged at suitable points above the respective belts of the proofer to coat the belts with flour.

The rollers 24 of the proofer are driven by any suitable driving means such as that conventionally indicated at 27. The speed of the driving means is varied in any suitable manner, a hand wheel 28 being provided to control the speed. Ordinarily the driving means are adjustable to provided for a minimum time of 5 minutes and a maximum time of 10 minutes before the units of dough disposed on the uppermost belt are discharged from the proofer. The interval of rest in the proofer is governed by the size and weight of the masses of dough as well understood by those skilled in the art. The proofer is preferably enclosed in a substantially dust-proof cabinet as indicated at 29 in Fig. 2.

In the processes heretofore commonly used by bakers, the masses of dough, after passing through the proofer above described, are dropped by gravity into a molder which molds the dough units into loaves. The dough is then placed by hand into the baking pans for a final proofing in a steam box and then placed in the oven for baking. In accordance with the present invention the units of dough are degassed, preferably by compressing the same, before the end of the proofing operation. It has been found that by this modification of the prior processes, a noteworthy improvement is obtained in the structure of the final product, the loaf having a much closer grain and finer texture. In order to accomplish this purpose with the conventional proofer as before described, the present invention in its preferred form provides a vertical conveyor at one end of the proofer adapted to receive and compress the dough units as they are discharged from the proofer, and the units are then subjected to a further rest period. Preferably the latter step is accomplished by conveying the masses of dough back to the proofer for a second passage therethrough.

As shown in Fig. 1, the masses of dough 17 are initially conveyed to the right-hand side of the proofer belts 20, 21, 22 and 23. From the belt 23 the masses of dough are received in a discharge chute 30 which extends laterally of the right-hand side of the belt 23 and overlies a horizontal portion 31a of a belt 31, forming a part of the vertical conveyor disposed at the end of the proofer. The vertical conveyor further comprises a second belt 32 having a horizontal portion 32a overlying the end of the uppermost proofer belt 20. The belts 31 and 32 are driven in any suitable manner, for example by the driving means 27.

The belts 31 and 32 are held substantially in contact with each other between the portion 31a of the belt 31 and the portion 32a of the belt 32 as indicated at 33. For this purpose pivoted guide rollers 34 may be provided. The belt 32 is tensioned by the arm 35 and spring 36, said arm engaging the pivot of one of the supporting rolls 37 for said belt, and being pivoted intermediate its ends to the frame of the proofer.

The masses of dough are gripped between the belts 31 and 32 in the portion 33 and are thus lifted from below the discharge chute 30 to a point above the uppermost belt 20 and adjacent the left-hand side of said belt (as viewed in Fig. 1) which is the opposite side from that which initially received the dough. During the elevation of the masses of dough as described, the same are subjected to a kneading action between the two belts 31 and 32 to remove gas accumulated in the dough during its first passage through the proofer. This kneading action is brought about by the arrangement of belts 31 and 32 in conjunction with the guide rollers 34. As will be noted, the dough-gripping and conveying stretches of these belts are arranged so as to compress the dough as the belts pass over rollers 34 and then permit the dough to expand, note particularly Fig. 2. This degassing operation is of vital importance to the improvement of the quality of the loaf.

As will be apparent from the foregoing, the masses of dough disposed upon the left-hand side of the proofer belt 20, as viewed in Fig. 1, pass again through the proofer and are discharged from the lower belt 23 into a second discharge chute 40 which conveys the dough by gravity to the molder, after which the dough is molded and baked as formerly.

It will be apparent that the apparatus described above is adapted to double-proof the masses of dough and also degasify the same before the end of the proofing operation by a relatively simple addition to the conventional proofer heretofore employed. Obviously the invention may be applied to any desired construction of proofer or may be utilized with a separate final proofer instead of using only a single proofer. Furthermore, the construction of the combined conveyor means and means for compressing the masses of dough may be changed or altered in many ways as will be apparent to those skilled in the art. For example, the masses of dough may be compressed between two rolls similar to molder rolls after passing through the proofer in order to degas the dough, after which the dough is subjected to a further proofing operation which may be effected by a second passage through the proofer. The construction shown however, is simple and has given excellent results in actual practice. It has the advantage that it may be embodied in a new installation or readily applied to equipment already in use.

As the modification described above and other modifications of the apparatus shown and described will be apparent, the invention is not limited to the embodiment shown but is of the scope indicated in the appended claims.

We claim:

1. In apparatus for treating masses of dough, a proofer, means for feeding masses of dough to said proofer, and means for receiving the masses of dough after they have passed through the proofer and for returning them for passage therethrough a second time, said latter means including conveyor belts having dough-gripping and conveying stretches which are arranged to alternately compress and permit the masses of dough to expand to thereby subject the latter to a kneading and degassing action.

2. Apparatus for treating masses of dough comprising, in combination, a proofer comprising a plurality of superimposed horizontally travelling belts adapted to carry individual masses of dough and so arranged that the said masses are transferred from one belt to the other, a conveyor for initially conveying the masses to the uppermost belt, and a vertically disposed conveyor at one end of said proofer for returning the masses from the lowermost to the uppermost of the said belts, said latter conveyor having belt stretches arranged to subject the dough to a plurality of kneading and degassing actions during the conveying operation.

3. Apparatus for treating masses of dough comprising, in combination, a proofer embodying a plurality of superimposed horizontally travelling belts adapted to carry individual masses of dough and so arranged that the said masses are transferred from one belt to the other, a conveyor for initially conveying the masses to the uppermost belt of the proofer, and another conveyor for receiving the masses from the lowermost belt of the proofer and for returning them to the uppermost belt thereof for reproofing, said latter conveyor having belt stretches between which the masses are gripped during conveyance, and guide rollers for said stretches arranged to cause an alternate compression and expansion of the masses of dough gripped between the stretches to thereby subject the dough to a kneading and degassing action.

ALBERT J. FAULHABER.
CARNOT R. WAGENER.